United States Patent [19]

Tseng

[11] Patent Number: 5,122,101
[45] Date of Patent: Jun. 16, 1992

[54] PARALLEL-AXIS COMBINATION GEAR DIFFERENTIAL

[75] Inventor: Gordon B. Tseng, Rochester, N.Y.

[73] Assignee: Zexel-Gleason USA, Inc., Rochester, N.Y.

[21] Appl. No.: 735,821

[22] Filed: Jul. 25, 1991

[51] Int. Cl.$^5$ .............................................. F16H 1/42
[52] U.S. Cl. ..................................... 475/252; 475/249
[58] Field of Search .................... 475/227, 249, 252

[56] References Cited

U.S. PATENT DOCUMENTS

| | | | |
|---|---|---|---|
| 1,108,800 | 8/1914 | Shrader | 475/252 X |
| 1,373,657 | 4/1921 | Finefrock | 475/252 |
| 1,760,839 | 5/1930 | Drew | 475/252 |
| 1,869,528 | 8/1932 | Trbojevich | 475/252 |
| 1,938,649 | 12/1933 | Welsh | 475/252 |
| 2,000,223 | 5/1935 | Du Pras | 475/252 |
| 2,269,734 | 1/1942 | Powell | 475/252 |
| 2,382,846 | 8/1945 | Barber | 475/252 |
| 2,479,638 | 8/1949 | Randall | 475/252 |
| 3,738,192 | 6/1973 | Belansky | 475/252 |
| 3,768,336 | 10/1973 | Wharton | 475/252 |
| 4,916,978 | 4/1990 | Razelli et al. | 475/252 |

Primary Examiner—Richard Lorence
Assistant Examiner—William O. Trousdell
Attorney, Agent, or Firm—Eugene Stephens & Associates

[57] ABSTRACT

In the disclosed torque-proportioning type of automotive differential, a parallel-axis planetary gear arrangement is carried within a housing rotatable about a pair of drive axles. A pair of sun/side gears receive, respectively, the ends of the coaxial drive axles. The side gears are interconnected by at least one planetary pair of combination gears. Each combination gear of the pair is in mesh with a respective one of the side gears, and each shares two separate and distinct meshing portions with its paired combination gear. For each combination gear, the two meshing portions shared with its paired gear straddle the portion of the gear which meshes with its respective side gear. In the preferred embodiments, the shared mesh portions are located at the two axial outer ends of the combination gears.

14 Claims, 2 Drawing Sheets

PARALLEL-AXIS COMBINATION GEAR DIFFERENTIAL

TECHNICAL FIELD

The invention relates to torque-proportioning type automotive differentials having planetary gear arrangements carried within housings that are rotatable about a pair of drive axles interconnected by the planetary gear arrangements.

BACKGROUND OF INVENTION

Gear differentials generally include compound planetary gear sets interconnecting a pair of drive axles to permit the latter to rotate in opposite directions with respect to a differential housing. The drive axles rotate about a common axis; and so-called "side" gears are fixed for rotation with the inner ends of the two drive axles, such side gears acting as the sun gear members of the compound planetary gear sets. The sun gears are interconnected by so-called "element" or "combination" gears, which form the planet gear members of the sets. The planet gears are mounted for rotation about axes that may be variously offset and inclined with respect to a common axis of the sun gears and drive shafts.

The relative positions of the sun and planet gear axes usually determine the kind of gearing that make up the planetary gear sets: Parallel axes are used for mounting spur or helical gears, e.g., see U.S. Pat. No. 2,269,734 (Powell), U.S. Pat. No. 2,382,846 (Barber), and U.S. Pat. No. 3,768,336 (Wharton); and orthogonal axes are used for mounting either bevel or worm gears, depending upon the presence of any offset between the axes. That is, bevel gears are used when the sun and planet gear axes intersect, while worm gears are used when the gear axes do not intersect (as an example of this latter type, see U.S. Pat. No. 1,373,657 to Finefrock).

The entire planetary gearing arrangement within the differential supports opposite relative rotation between the drive axle ends (i.e., differentiation), which is necessary to permit the axle ends to be driven at different speeds. Torque transmitted to the drive axles through the inclined tooth surfaces of the sun/side gears generates thrust forces against gear-mounting bearing surfaces within the differential. (Such bearing surfaces may comprise journals formed in the housing, or may be the ends of bores into which the gears are received, or may be special washers positioned between the end faces or shaft ends of the gears and the housing.) The thrust forces, together with other loads conveyed by the gear meshes in the planetary gearing, produce a frictional resistance to relative rotation between the drive axles, this frictional resistance being proportional to the torque applied to the differential housing. The proportional frictional resistance supports different amounts of torque between the two drive axles to prevent their relative rotation until the characteristic "bias" ratio of the planetary gearing arrangement is reached. Once the frictional resistance is overcome and differentiation begins, the torque difference between the axles is proportioned in accordance with the bias ratio. Differentials that divide torque in a substantially constant ratio between relatively rotating drive axles, are referred to as "torque-proportioning" differentials.

The ability to support different amounts of torque between the drive axles is of great benefit to improving traction capabilities of vehicles. Ordinarily, when one wheel of a vehicle with a conventional differential loses traction, the amount of torque that can be delivered to the other drive wheel is similarly reduced. However, when one wheel loses traction so that there is differentiation between the two axles, torque-proportioning differentials deliver an increased amount of torque to the drive wheel having better traction, such increased torque being determined by the characteristic bias ratio of the differential.

Some well-known torque-proportioning differentials use planetary gearing assemblies with orthogonal axes, while others use gearing assemblies with parallel axes. Examples of the latter type are U.S. Pat. No. 1,938,649 (Welsh), U.S. Pat. No. 2,000,223 (DuPras), and U.S. Pat. No. 2,479,638 (Randall). The above-cited Finefrock patent is an example of a torque-proportioning differential using orthogonal axes and worm gearing.

In general, the gears used in parallel-axis/helical-gear assemblies are usually simpler to manufacture than are the gears used in torque-proportioning designs of the orthogonal-axis/worm-gear type. However, when the latter are made with the same number of sun and planet elements as the former, they usually develop greater frictional resistance between their respective gear meshes and support bearings; and this, in turn, provides greater torque bias and/or increased control over the bias ratio. In differentials of the worm-gear type, the sun/side gears are a pair of helical worm gears which are interconnected by a plurality of so-called element gears that are mounted in planetary pairs within the body portion of the housing. The axes of rotation of each element gear of a pair are parallel to each other, but are crossed and nonintersecting with respect to the common axis of rotation of the side gears. Typically, the side gears are interconnected by three such pairs of element gears mounted in the housing at even angular increments about the periphery of the side gears.

The planet/element gears of the worm-gear type differential are in reality combination gears, i.e., the middle portion of each element gear is formed as a worm wheel, while its respective axial end portions are formed as spur gears. The gear arrangement of the worm-gear type torque-proportioning differential is such that: for any given pair of element gears, the worm wheel portion of a first element gear meshes with one side gear; the worm wheel portion of a second element gear of the pair meshes with the other side gear; and the spur gear portions of the respective element gears mesh with each other.

The typical parallel-type torque-proportioning differential (such as that disclosed in the DuPras reference cited above) also fixes sun/side gears to the ends of the two drive axles and interconnects these side gears with pairs of planet gears. Each planet gear is in mesh with its paired planet gear; and each gear in the pair meshes, respectively, with one of the side gears. However, in contrast with the worm-gear type element gears just described above, in parallel-axis assemblies the planet gears are not formed with a middle portion and two axial end portions. Instead, one axial end of each individual planet gear is in mesh with its respective side gear, and its other axial end is in mesh with its paired planet gear. This form of planetary gear is also used in those parallel-axis differentials which, instead of pairs of planetary gears, mount the planetary gears in a continuous circular mesh around the full circumference of each respective side gear, e.g., see U.S. Pat. No. 1,869,528

(Trbojevich) and U.S. Pat. No. 3,738,192 (Belansky). That is, in all known parallel-axis torque-proportioning differentials, the planetary gear pairs mesh with each other at only one of their axial ends, and their respective loads are often carried primarily by only one end of their axial mounting supports.

My invention improves the load balance on the planetary gear mounting supports of such parallel-axis torque-proportioning differentials and, additionally, provides such differentials with an increase in frictional surfaces, thereby providing greater control over bias ratio. Further, my parallel-axis differential includes novel planetary gear pairs having separated double-meshing engagement such as that which has only been known heretofore in worm-type, orthogonal-axis differentials.

SUMMARY OF THE INVENTION

The invention comprises improved parallel-axis planetary gearing for use in automotive differentials of the torque-proportioning type. The sun/side gears of my differential, which are adapted to be fixed to the ends of the coaxial drive axles, are interconnected by at least one planetary pair of combination gears. Each combination gear of the pair is in mesh with a respective one of the side gears, and each shares two separate and distinct meshing areas with its paired combination gear. For each combination gear, the two meshing portions shared with its paired gear straddle the portion of the gear which is in mesh with its respective side gear. In the preferred embodiments, the shared mesh portions are located at the two axial outer ends of the combination gears.

The three meshing portions of each combination gear can be designed with either spur or helical teeth, and each of the three portions can have different gear tooth arrangements. However, in one preferred embodiment, the combination gears of each pair have meshing portions designed with sets of helical teeth of equal magnitude but with helix angles of opposite hand; and the respective side gears of the preferred planetary assembly also have similar helical teeth but of opposite hand.

In another preferred embodiment, all of the combination gears are identical; but the two separate and distinct meshing areas, which each combination gear shares with its paired combination gear, have opposite hand helix angles. Also, the two side gears both have the same hand of helix. This arrangement creates axial thrust forces on the combination gears, and the end thrust face of each combination gear becomes an additional frictional surface which can be used for increasing and/or controlling torque bias. (Such increased end-thrust arrangements are disclosed in a commonly-assigned U.S. Patent Application entitled "End-Thrust Design for Parallel-Axis Differential" filed in the names of J. S. Dye and G. B. Tseng on even date herewith, the disclosure of which is hereby incorporated by reference.)

Further, the preferred combination gears have only two sets of separated gear teeth. While the two meshing portions shared between the gear pair are still located at the axial outer ends of each combination gear, one of the shared meshing portions of each gear is contiguous with that portion of the gear which is in mesh with its respective side gear; and this contiguous meshing area of each combination gear is separated from its other toothed area by a space which provides clearance for avoiding contact with the side gear associated with its paired combination gear The invention's novel design for its paired planetary gears provides significant improvements over the prior art. It places the loads on these gears as near as possible to the outer ends of their axial supports. Further, the gear-to-gear loads shared by each pair of these combination gears are more appropriately balanced. This design also provides, as indicated above, more frictional surfaces for the increase and/or greater control of torque bias.

DRAWINGS

DETAILED DESCRIPTION

Figure 1:
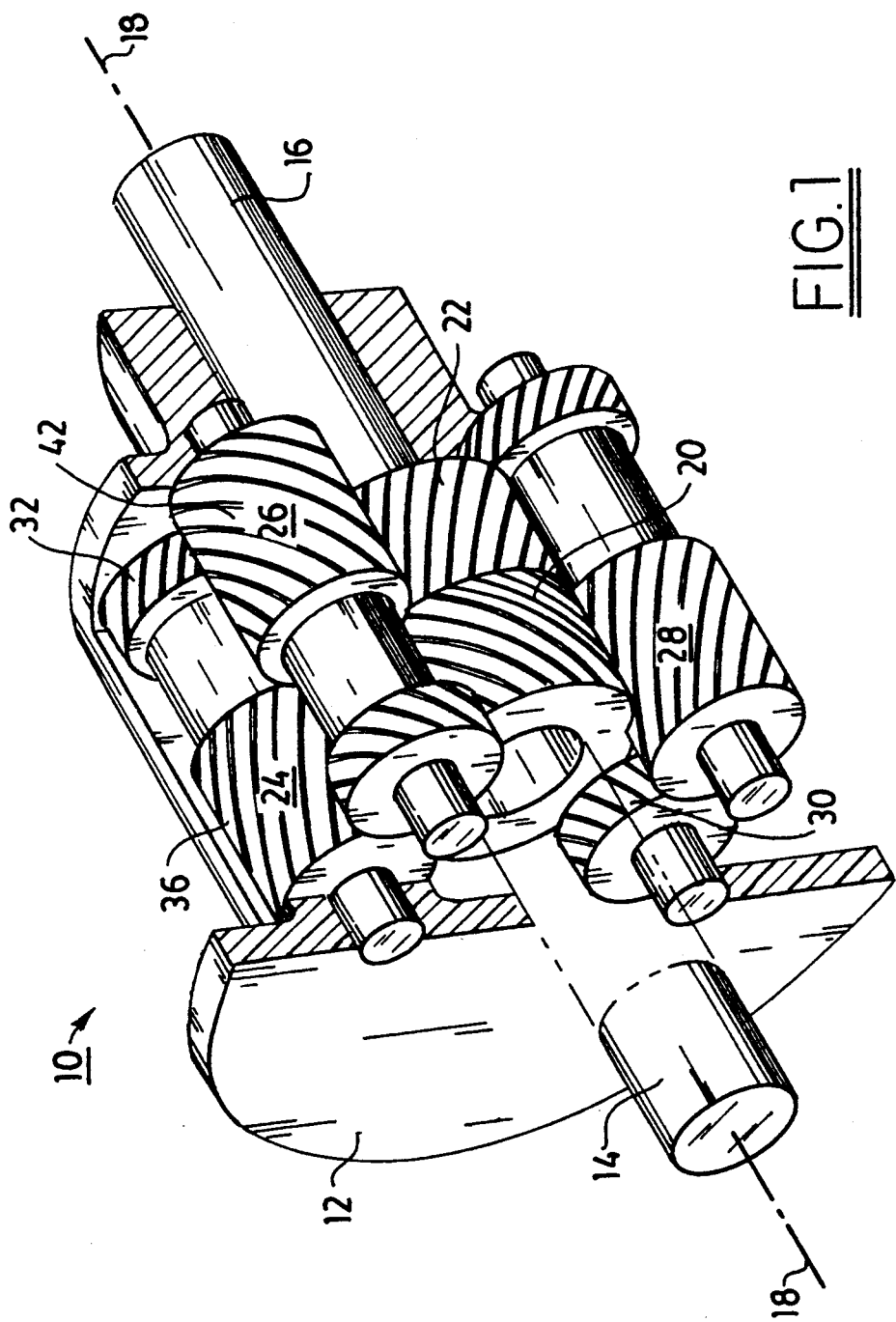
FIG. 1 is a perspective representation of a preferred embodiment of a torque-proportioning differential according to the invention, parts being removed to reveal the planetary gear assembly.

Referring to FIG. 1, a differential 10 has a housing 12 which receives and supports the ends of two drive axles 14, 16 which are both mounted concentric with axis 18. Fixed to the ends of axles 14, 16 are, respectively, side gears 20 and 22 which act as respective sun gears for the planetary gear arrangement shown. Equally spaced about the circumference of side gears 20, 22 are two sets of planetary gear pairs comprising, respectively, combination gears 24, 26 and 28, 30.

One combination gear of each planetary pair is in mesh with a respective one of the side gears, combination gears 24 and 28 being in mesh with side gear 20, while combination gears 26 and 30 are in mesh with side gear 22. Further, the combination gears of each pair are in mesh with each other near the axial ends of each of the combination gears. This relationship can best be seen in the symbolic diagrams illustrated in FIGS. 2 and 3 in which, for purposes of simplification, the basic planetary arrangement has been unwrapped so that the two side gears 20, 22 are shown at opposite sides of the symbolic arrangement, common axis 18 having been split as indicated.

Figure 2:
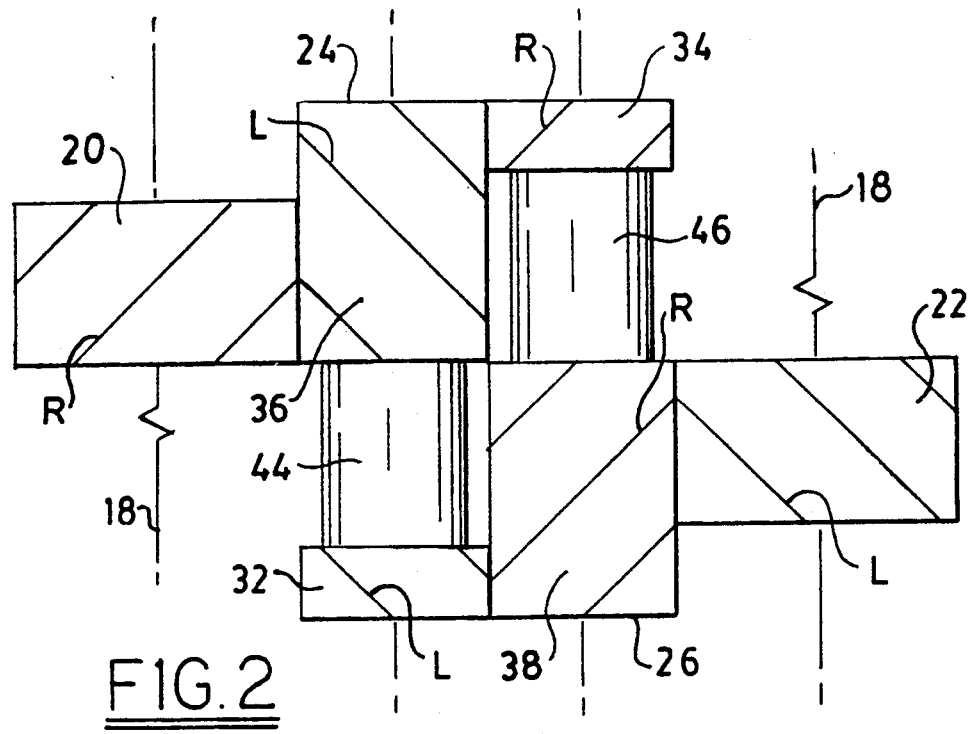
FIGS. 2 and 3 are symbolic diagrams of two possible gear tooth designs for the gears of the assembly shown in FIG. 1.

Referring to FIG. 2, each combination gear 24, 26 has a respective axial end portion 32, 34 which meshes with the opposite end portion of its paired gear. At the opposite end of each combination gear is a larger contiguous meshing area 36, 38 carrying gear teeth which mesh with each gear's respective side gear 20, 22 as well as with the axial end portions 34, 32 of its paired combination gear.

In the preferred embodiments, each combination gear is manufactured from a single piece of bar stock. However, each of the three distinct meshing portions of each combination gear could be manufactured from separate blanks, being appropriately interconnected, e.g., by splines to a common shaft, so that they rotate as a unit.

Each combination gear is appropriately mounted in housing 12 by any one of a number of well-known means, e.g., being supported in appropriate bearings formed in casing 12 by means of axial pins or by means of journals formed integrally at the axial ends of the gear blank.

Figure 3:
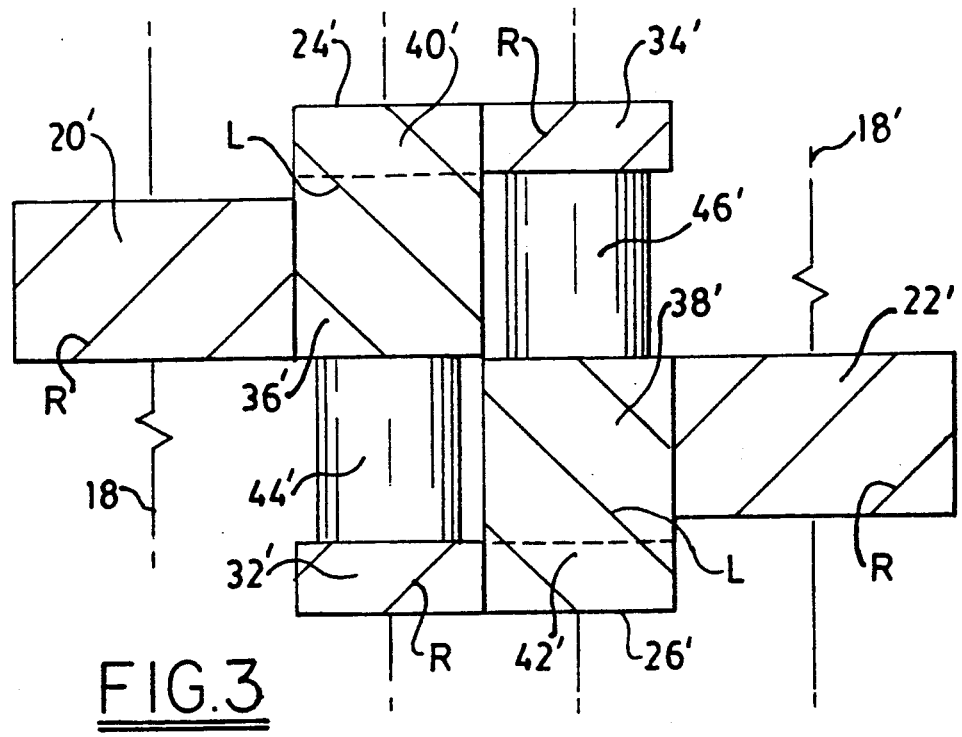

A further preferred embodiment of the invention shown in FIG. 3 requires only two different gear designs for the manufacture of the compound planetary assembly: The same right-hand helical design is used for both side gears 20' and 22'; and the same design is used for all of the combination gears 24', 26', 28', 30'. Namely, the combination gears are all manufactured with their contiguous meshing areas 36', 42' having left-hand helical teeth (L) for meshing with the right-hand helical teeth (R) of the side gears, and with their respective axial end portions 32', 34' having the same right-hand helical tooth design used for the side gears and, therefore, appropriate for meshing with the axial end portions 40', 42' of the mating combination gears.

In the preferred forms of the invention, contiguous meshing areas 36, 36', 38, 38' include gear teeth of similar helix angle and design throughout the entire contiguous area. However, it is also possible to design the end portions 40', 42' of each combination gear with different tooth designs so that the mating end portions of each pair of combination gears include teeth different from those which mate with the respective side gears 20, 22.

While the need for only two basic gear designs simplifies manufacture, the arrangement shown in FIG. 3 may not be appropriate for some designs, since the thrust forces acting on side gears 20', 22' are not balanced. In contrast, in the compound planetary arrangement of FIG. 2, side gear 20 has right-hand helical teeth (R), while side gear 22 has left-hand helical teeth (L); and combination gear 24 has mating left-hand helical teeth (L) for both its contiguous meshing area 36 and its axial end portion 32, while combination gear 26 has right-hand helical teeth (R) for both of its meshing areas. The design of FIG. 2 requires the use of four different gear elements.

Preferred combination gears also include respective spacing areas 44, 44', 46, 46' for providing clearance to avoid interference with the sun/side gear associated with its paired combination gear. This can best be appreciated from the perspective view shown in FIG. 1.

While the compound planetary gear assembly shown in FIG. 1 has only two sets of combination gear pairs mounted 180° apart, the preferred embodiment of the invention includes three such planetary pairs arranged at 120° intervals around the circumference of the side gears. Of course, the invention could also be made with the planetary combination gears being positioned in one contiguous circle circumferentially around the side gears. With such an arrangement, every other combination gear meshes with the opposite respective side gear, and it would also mesh in two areas with both of its adjacent combination gears.

As indicated above, the two separated areas at which each combination gear meshes with its paired combination gear straddle the position where each combination gear meshes with its respective associated side gear. Further, the contiguous meshing areas 36, 38 are not located in the central portion of the gear but rather are positioned closer to one of its supported axial ends. Also, the separated areas at which each pair of combination gears mesh with each other are positioned, respectively, in proximity to the axial ends of the gears, thereby more appropriately distributing the loads shared by the axial supports for each of these planetary pairs.

I claim:

1. A differential assembly comprising:
    a differential housing;
    a pair of side gears positioned in said housing for receiving a pair of respective axle ends for rotation therewith about a common axis;
    at least one pair of combination gears supported in said housing, each respective combination gear in each said pair being in meshing engagement with both a respective one of said side gears and with its paired combination gear, the meshing engagement of said side and combination gears interconnecting said respective axle ends in a mutual driving relationship;
    said combination gears being supported in said housing with their respective axes aligned in parallel with the common axis of said side gears; and
    the combination gears of each said pair being in mesh with each other at two separated areas which straddle the position where each combination gear meshes with its respective side gear.

2. The assembly of claim 1 wherein said separated areas at which each pair of combination gears mesh are positioned, respectively, in proximity to the axial ends of the combination gears.

3. The assembly of claim 1 wherein said side and combination gears all have helical teeth.

4. The assembly of claim 3 wherein said side gears have teeth inclined, respectively, at opposite-handed helical angles, and wherein the combination gears of each pair have, respectively, mating teeth of opposite-handed helical angles.

5. The assembly of claim 3 wherein said side gears have teeth inclined, respectively, at helical angles of the same hand, and wherein the combination gears of each pair have, respectively, two separated sets of gear teeth each having helical angles of the opposite hand.

6. The assembly of claim 1 wherein one of said separated areas at which each pair of combination gears mesh is contiguous with the area in which each said combination gear meshes with its respective side gear.

7. The assembly of claim 6 wherein said contiguous meshing area of each combination gear is separated from its other area of meshing engagement with its paired combination gear by a spacing area which provides clearance for avoiding contact with the side gear associated with its paired combination gear.

8. A gear differential having compound planetary gearing comprising:
    a housing that is rotatable about a pair of axle shafts which share a common axis;
    a pair of sun gears adapted to receive the respective ends of said axle shafts for rotation within said housing;
    at least one pair of planetary gears mounted for rotation within said housing on respective axes which are parallel to said common axis; and
    each planetary gear having a plurality of toothed portions for meshing engagement with its paired planetary gear and with a respective one of said sun gears,
so that the planetary gears of each said pair mesh with each other at two separated areas which straddle the respective positions where each planetary gear meshes with its associated sun gear.

9. The gear differential of claim 8 wherein said separated areas at which each pair of planetary gears mesh are positioned, respectively, in proximity to the axial ends of the planetary gears.

10. The gear differential of claim 8 wherein said sun and planetary gears all have helical teeth.

11. The gear differential of claim 10 wherein said sun gears have teeth inclined, respectively, at opposite-handed helical angles, and wherein the planetary gears of each pair have, respectively, mating teeth of opposite-handed helical angles.

12. The gear differential of claim 10 wherein said sun gears have teeth inclined, respectively, at helical angles of the same hand, and wherein the planetary gears of each pair have, respectively, two separated sets of gear teeth each having helical angles of the opposite hand.

13. The gear differential of claim 8 wherein one of said separated areas at which each pair of planetary gears mesh is contiguous with the area in which each said planetary gear meshes with its respective sun gear.

14. The gear differential of claim 13 wherein said contiguous meshing area of each planetary gear is separated from its other area of meshing engagement with its paired planetary gear by a spacing area which provides clearance for avoiding contact with the sun gear associated with its paired planetary gear.

* * * * *